(12) United States Patent
Grunau et al.

(10) Patent No.: US 8,633,271 B2
(45) Date of Patent: Jan. 21, 2014

(54) PLASTIC PART, SPECIFICALLY A CAGE FOR A BEARING, CONSISTING OF A RADIATION-CROSSLINKABLE PLASTIC MATERIAL, AND METHOD FOR THE PRODUCTION THEREOF

(75) Inventors: Arbogast Grunau, Weisendorf (DE); Sergej Schwarz, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 251 days.

(21) Appl. No.: 13/059,688

(22) PCT Filed: Aug. 18, 2009

(86) PCT No.: PCT/DE2009/001175
§ 371 (c)(1),
(2), (4) Date: May 24, 2011

(87) PCT Pub. No.: WO2010/020238
PCT Pub. Date: Feb. 25, 2010

(65) Prior Publication Data
US 2011/0216994 A1    Sep. 8, 2011

(30) Foreign Application Priority Data

Aug. 20, 2008 (DE) .......................... 10 2008 038 578

(51) Int. Cl.
*C08K 3/34* (2006.01)

(52) U.S. Cl.
USPC .......................................... 524/442; 524/494

(58) Field of Classification Search
USPC ................................................. 524/442, 494
See application file for complete search history.

(56) References Cited

FOREIGN PATENT DOCUMENTS

| DE | 10 2004 053 376 A1 | 6/2005 |
| DE | 103 51 812 A1 | 6/2005 |
| DE | 103 51 813 A1 | 6/2005 |
| DE | 10 2006 034 333 A1 | 1/2008 |
| EP | 0 644 344 A | 3/1995 |
| JP | 8 276 506 A | 10/1996 |
| WO | 2007/047294 A | 4/2007 |

*Primary Examiner* — Edward Cain
(74) *Attorney, Agent, or Firm* — Lucas & Mercanti, LLP

(57) ABSTRACT

A plastic part, especially a bearing part, specifically a cage for receiving rolling bodies of a bearing. The body of the plastic part is essentially made of a radiation-crosslinkable plastic material. Pigments that undergo a visible change during the irradiation are mixed in with the plastic material. Also, a method is disclosed for producing a plastic part, especially a bearing part, specifically a cage for receiving rolling bodies of a bearing the plastic part that has a body made of a radiation-crosslinkable plastic material.

8 Claims, 1 Drawing Sheet

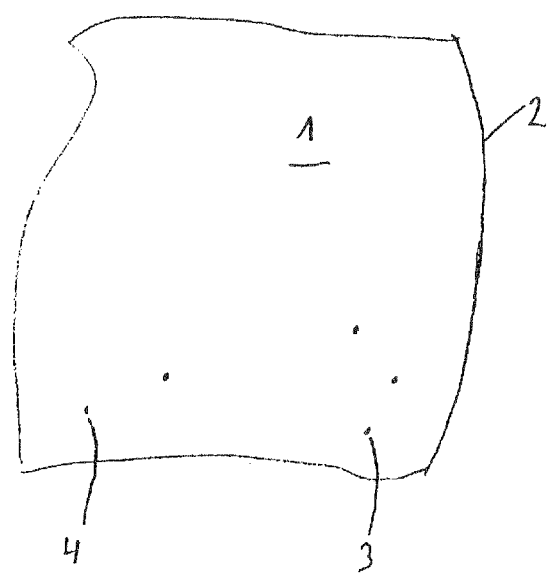

PLASTIC PART, SPECIFICALLY A CAGE FOR A BEARING, CONSISTING OF A RADIATION-CROSSLINKABLE PLASTIC MATERIAL, AND METHOD FOR THE PRODUCTION THEREOF

This application is a 371 of PCT/EP2009/001175 filed Aug. 18, 2009, which in turn claims the priority of DE 10 2008 038 578.6 filed Aug. 20, 2008, the priority of both applications is hereby claimed and both applications are incorporated by reference herein.

FIELD OF THE INVENTION

The invention relates to a plastic part, in particular a bearing part, specifically a cage for receiving rolling bodies of a bearing, specifically of a rolling bearing. The body of the plastic part substantially consists of a radiation-crosslinkable plastics material. The invention also relates to a method for producing a plastic part, in particular a bearing part, specifically a cage for receiving rolling bodies of a bearing, the plastic part having a body of a radiation-crosslinkable plastics material.

BACKGROUND OF THE INVENTION

Wherever reference is made hereafter in the description of the invention to a cage of a radiation-crosslinkable plastics material or to a method for producing a cage, it is understood that, instead of the cage, the invention also applies to a bearing part, for example a bearing ring of a rolling or sliding bearing or a sliding lining of a sliding bearing or a lining of a slideway of a rolling bearing or a plastic seal, for example for a bearing, or a plastic part in general.

In the production of a cage for a bearing, the irradiation with high-energy ionizing radiation, for example with x-ray or UV radiation or by means of particle radiation (such as for example beta radiation) brings about a chemical crosslinkage of the material of the body of the cage, which as a result of the irradiation is improved significantly with respect to the resistance to wear. It proves to be difficult in practice without additional aids to determine whether a sufficient pretreatment of the material of the cage by irradiation has taken place. The lack of a possible means by which the state of the irradiation of the plastics material can be detected in a simple way, in particular under the conditions of mass production, is currently making it more difficult to produce cages or generally plastic parts from a radiation-crosslinkable plastics material. In production, complex, expensive measures are required in the process sequence to be able to establish with certainty whether the plastics material has been irradiated.

It is known from DE 10 2004 053 376 A1 and the documents cited therein as well as from JP 08276506 AA (Abstract) to add laser-sensitive pigments to a plastics material, so that the plastics material provided with the pigments is given a marking or inscription during the laser treatment.

It is also known, for example from DE 103 51 813 B4 or else DE 103 51 812 B4, to activate plastics materials such as PTFE by means of ionizing radiation in order to couple to the activated plastics material organic molecules such as polyamide, and thereby form a covalent bond.

EP 0 644 344 B1 describes a method for producing a cage of a rolling bearing that receives rolling bodies, the body of the cage being produced from a plastics material that can be crosslinked when exposed to radiation, in particular when exposed to beta radiation, and the body of the cage being fitted with rolling bodies during the further course of the method.

When carrying out the method, it is provided that the produced body of the cage is first fitted with the rolling bodies and then exposed to the radiation. It proves to be disadvantageous here that the rolling bodies received in the body partially shield the adjacent region of the body from the radiation, so that, specifically in the vicinity of the rolling bodies, the strengthening of the body is incomplete. No matter whether the cage is fitted with the rolling bodies before or after the irradiation, it is not evident from the appearance of the body whether the irradiation has taken place. The production of radiation-crosslinkable plastic cages therefore requires sophisticated quality control. Furthermore, it is envisaged to use for the irradiation a dose that is chosen rather too high, in order to ensure that the cages are completely crosslinked, and therefore strengthened, along the entire body. This is counter to a requirement for lowest possible radiation exposure.

OBJECT OF THE INVENTION

The object of the invention is to provide a simple possible means for detecting the state of irradiation of the radiation-crosslinkable plastics material in the production of the plastic parts, specifically the cage for the rolling bearing.

SUMMARY OF THE INVENTION

This object is achieved according to a plastic part, which comprises a body of a radiation-crosslinkable plastic material admixed with radiation-crosslinkable plastic pigments that undergo a visually verifiable change during irradiation, and according to a method for producing the plastic part which has a body of a radiation-crosslinkable plastic material that comprises the steps of providing a mixture of the radiation-crosslinkable plastic material and a pigment and radiation-crosslinking the mixture.

During the irradiation, the pigments admixed with the radiation-crosslinkable plastics material of the body of the plastic part, specifically the cage, undergo a visually perceptible change, which can easily be picked up and quickly determined.

The visually detectable change in the pigments may be, for example, a change of color which the pigments undergo as a result of the irradiation and which changes the color of the pigments and consequently the color of the body of the cage. It can in this way easily be established whether the body of the cage has been irradiated sufficiently, so that the required strength is achieved, and also whether there are regions on the body of the cage that have not received sufficient irradiation, for example as a result of shielding from the radiation. For example, it may be envisaged to subject critical regions, for example those that require particularly high mechanical strength or have been shielded during the first irradiation, to a further targeted irradiation as a post-treatment.

There is also the possibility of carrying out the irradiation in a targeted manner and, in particular, choosing the radiation dose as low as possible and adapting it specifically to the production process.

The use of pigments in the production of plastic parts from radiation-crosslinkable plastics material as an indicator of the irradiation can be easily integrated into mass production and offers the further advantage that the pigments have little or no influence on the mechanical properties of the plastic body.

It also goes without saying that the pigments can likewise indicate whether the body of the cage has been subjected to a thermal treatment. If need be, two types of pigments may be provided, the first type indicating a change of color under irradiation with the high-energy radiation, specifically with x-ray or UV radiation, and the second type of pigments experiencing a change of color when heat is supplied, for example during a thermal treatment after the irradiation or when heat is introduced during the operation of the cage. As a result of heat being supplied, the visual change in the pigments, for example the change of color, may be reversed, or the pigments may undergo a further visual change, for example a further change of color.

The choice of pigments, the arrangement of the pigments on the surface or in the depth of the body of the cage and the conditions under which the pigments experience the change of color also make it possible to allow the cage to be provided with a coding, represented by the pigments, in such a way that a specific cage or specific batch of cages can be easily identified and forgeries verified in a simple manner, since, although a forger can simply imitate a color of the cage, the choice of pigments and their arrangement before the change of color can be kept secret and, if need be, changed easily and at short notice, without the color of the cage after the change of color of the pigments changing significantly.

It is preferably provided that the pigments comprise a powder of glasses, precious stones or semiprecious stones. The fine powder particles change the mechanical properties of the plastics material of the body of the cage only insignificantly. However, it is known for example for glasses that, when exposed to high-energy, ionizing radiation such as x-ray, UV or particle radiation, they become cloudy (if the glasses were transparent) and/or discolored (for example become darker). For a body of a cage which has been produced as an injection molding and the body of which substantially consists of a radiation-crosslinkable plastics material to which fine particles of glasses have been admixed, it correspondingly applies that, during the irradiation, the body undergoes a change of color, for example a gray coloration, which indicates at which location of the body and to what extent the crosslinking of the plastics material has progressed. The same applies correspondingly to powder comprising fine particles of a precious stone or a semiprecious stone, such as for example beryl, diamond, quartz, sapphire, spodumene, topaz, tourmaline or zirconium, which are each either colorless before the irradiation and given a definite color by the irradiation or have a color before the irradiation that differs clearly detectably from the color after the irradiation.

As an alternative to the inorganic pigments mentioned, the pigments may also comprise organic pigments, for example organic complexes, which are stable at temperatures up to about 100° C. and experience a change of color under irradiation with ionizing high-energy radiation.

Further advantages and features of the invention emerge from the dependent claims and from the description of a preferred exemplary embodiment.

The invention is described and explained in more detail below with reference to the accompanying drawing.

The invention will be further understood and appreciated by reading the following description in conjunction with the accompanying drawing, in which:

BRIEF DESCRIPTION OF THE DRAWING

The Figure schematically shows a detail of an exemplary embodiment of a plastic part according to the invention.

DETAILED DESCRIPTION OF THE DRAWING

The Figure shows a detail of a body 1 of a plastic part that is not represented any further, in particular a bearing part, specifically a cage for receiving rolling bodies of a rolling bearing. The body 1 has a surface 2 and substantially consists of a radiation-crosslinkable plastics material, for example PA66 with PTFE. A plastics material of this type can be crosslinked when exposed to high-energy radiation, preferably in particular x-radiation, so that the body 1 of the cage is strengthened with respect to resistance to wear.

Pigments 3, 4 are admixed with the plastics material of the body 1 of the cage, the pigments 3, 4 being chosen such that, during the irradiation, they change color in such a way as to make it possible for there to be an outwardly visible change in the visual appearance of the body 1 of the cage in comparison with the rest of the material of the body 1, in particular a change of color of the body 1 of the cage.

The plastics material may be provided as a light-colored, in particular whitish, plastics material. The pigments 3, 4 are formed as particles of a powder comprising zirconium, the relative sizes for the dimensions of the particles in FIG. 1 not being to scale. In the unirradiated state, zirconium is substantially colorless. In the state before the irradiation with x-rays, the body 1 of the cage is substantially whitish/light-colored. The irradiation makes the zirconium particles 3, 4 undergo a change of color to blue or brown, so that the body 1 becomes darker after the irradiation. The locally dependent darkening of the body 1 of the cage is in this case a measure of the radiation dose to which this location has been exposed, and consequently an indicator of the degree of crosslinking of the plastics material.

It goes without saying that the invention is not restricted to the use of zirconium particles as pigments. Possible other pigments, specifically inorganic pigments, include particles of glasses, semiprecious stones or precious stones such as beryl (changing under irradiation from pale yellow to pale pink in color to green or dark blue), diamond (changing under irradiation from yellowish or brownish or colorless to blue, red, green or black), quartz (changing under irradiation from colorless to brown or black), sapphire (changing under irradiation from colorless, pink or pale green to green), spodumene (changing under irradiation from pink to yellow or green) or topaz (changing under irradiation from colorless to blue, brown, green or orange).

The invention is likewise not restricted to the use of inorganic pigments; organic pigments could likewise be provided.

In the case of the exemplary embodiment described above, the pigments 3 close to the surface 2 of the body 1 were of the same material as the pigments 4 far away from the surface 2. It goes without saying that different types of pigments may be provided depending on the distance from the surface 2. Since the intensity of the radiation decreases with the distance from the surface 2 in the body 1, the pigments 3 close to the surface 2 will show a change of color first, then later the pigments 4 further away from the surface 2. For example, zirconium particles of a zirconium powder may be provided as pigments 3 and particles of a sapphire powder may be provided as pigments 4 further away from the surface 2, both the zirconium particles and the sapphire particles being substantially colorless in the unirradiated state, and the body 1 of the plastic cage appearing whitish. During the irradiation, the pigments 3 are first to change their color, from colorless to blue or brown, so that the body 1 of the cage becomes darker overall. As the irradiation progresses, the pigments 4 also change their color, from colorless to green, so that the body 1 of the cage becomes dark green overall.

It also goes without saying that different pigments 3, 4 may be present at different locations of the body 1 of the plastic part. The pigments 3, 4 may also be provided exclusively at those regions of the body 1 in which adequate strength must definitely be ensured, for example in the region of the cage cross-pieces of the body 1.

The invention has been described above on the basis of an exemplary embodiment in which the body 1 of the cage consisted of PA66 with PTFE. It goes without saying that other radiation-crosslinkable plastics materials, such as different types of polyamide, types of polyetheretherketone, polypropylene, polyethylene or polyurethane or PTFE, may also be provided as the plastics material. Furthermore, it may be provided that, in addition to the pigment 3, 4, the radiation-crosslinkable plastics material contains plasticizers or crosslinking promoters as admixtures. Furthermore, it may also be provided that the plastics material may contain further additions such as reinforcing fibers.

For the purposes of the present invention, the term 'pigment' comprises not only those materials which, during irradiation, undergo a change of color that is detectable in the range of visible light. Those materials which do not directly experience a change of color during the irradiation, but become luminescent, specifically also can be induced by the irradiation to become phosphorescent or fluorescent, in particular during subsequent illumination, for example by means of UV radiation, may also be provided as pigments. A body in which a fluorescent pigment has been added does not need to have a significant change of color in the range of visible light during the irradiation that brings about the crosslinking of the plastics material, but can make the irradiation previously carried out visibly verifiable when it is subsequently illuminated with UV light.

LIST OF DESIGNATIONS

1 Body
2 Surface
3 Pigment
4 Pigment

The invention claimed is:

1. A plastic part, comprising:
   a body of a radiation-crosslinkable plastic material admixed with radiation-crosslinkable plastic pigments that undergo a visually verifiable change during irradiation,
   wherein the plastic part is a bearing part, the bearing part being a cage.

2. The plastic part as claimed in claim 1, wherein the pigments comprise a powder of glasses, precious stones or semiprecious stones.

3. The plastic part as claimed in claim 1, wherein the pigments comprise organic pigments.

4. The plastic part as claimed in claim 1, wherein the body has a surface and a type of the pigments varies with a distance from the surface.

5. The plastic part as claimed in claim 1, wherein the pigments are inducible to become luminescent by the irradiation.

6. The plastic part as claimed in claim 5, wherein the pigments are inducable by phosphorescent or fluorescent irradiation.

7. A method for producing a plastic part having a body of a radiation-crosslinkable plastic material, comprising the steps:
   admixing pigments in the radiation-crosslinkable plastic material as an irradiation indicator,
   wherein the plastic part is a bearing part, the bearing part being a cage.

8. A method for producing a plastic part having a body of a radiation-crosslinkable plastic material, comprising the following steps:
   providing a mixture of the radiation-crosslinkable plastic material and a pigment; and
   radiation-crosslinking the mixture,
   wherein the plastic part is a bearing part, the bearing part being a cage.

* * * * *